US009509626B2

(12) United States Patent
Adolph et al.

(10) Patent No.: US 9,509,626 B2
(45) Date of Patent: Nov. 29, 2016

(54) METHOD AND APPARATUS FOR PROVISIONING A VIRTUAL MACHINE (VM) FROM A NETWORK SERVICE PROVIDER

(71) Applicant: Ciena Corporation, Hanover, MD (US)

(72) Inventors: Stephen Kieran Adolph, Ottawa (CA); Michael Alain Gazier, Ottawa (CA); Ian Hamish Duncan, Ottawa (CA); James Andrew Frodsham, Ottawa (CA); Denis Fluet, Longueuil (CA)

(73) Assignee: Ciena Corporation, Hanover, MD (US)

( * ) Notice: Subject to any disclaimer, the term of this patent is extended or adjusted under 35 U.S.C. 154(b) by 269 days.

(21) Appl. No.: 14/056,628

(22) Filed: Oct. 17, 2013

(65) Prior Publication Data

US 2015/0113142 A1   Apr. 23, 2015

(51) Int. Cl.
| | | |
|---|---|---|
| G06F 9/455 | (2006.01) | |
| H04L 12/911 | (2013.01) | |
| G06F 9/445 | (2006.01) | |
| H04W 4/18 | (2009.01) | |
| H04W 4/12 | (2009.01) | |
| H04W 92/02 | (2009.01) | |

(52) U.S. Cl.
CPC ............ *H04L 47/70* (2013.01); *G06F 8/63* (2013.01); *G06F 9/45558* (2013.01); *G06F 2009/45562* (2013.01); *H04W 4/12* (2013.01); *H04W 4/18* (2013.01); *H04W 92/02* (2013.01)

(58) Field of Classification Search
CPC ... H04L 12/4641; H04L 47/70; H04L 67/10; H04L 43/0876; H04L 67/34; G06F 9/45558; G06F 9/45533; G06F 2009/4557; H04W 92/02; H04W 4/12; H04W 4/18; H04M 1/72527; H04M 2203/1091; H04M 2207/18
See application file for complete search history.

(56) References Cited

U.S. PATENT DOCUMENTS

| | | | |
|---|---|---|---|
| 8,218,445 B2 * | 7/2012 | Katz | .................... H04L 12/24 370/238 |
| 8,365,169 B1 | 1/2013 | Watson et al. | |
| 8,650,299 B1 * | 2/2014 | Huang | ................. G06F 9/5077 709/226 |
| 2008/0201455 A1 | 8/2008 | Husain | |
| 2012/0030672 A1 | 2/2012 | Zygmuntowicz et al. | |
| 2012/0179817 A1 | 7/2012 | Bade et al. | |
| 2012/0240110 A1 | 9/2012 | Breitgand et al. | |
| 2013/0034021 A1 | 2/2013 | Jaiswal et al. | |

(Continued)

OTHER PUBLICATIONS

Network Functions Virtualisation—Introductory White Paper. Issue 1. An Introduction, Benefits, Enablers, Challenges & Call for Action, pp. 1-16.

(Continued)

*Primary Examiner* — Chirag R Patel
(74) *Attorney, Agent, or Firm* — Clements Bernard PLLC; Christopher L. Bernard; Lawrence A. Baratta, Jr.

(57) ABSTRACT

A method and apparatus facilitates an enterprise to lease virtual appliances from network services provider. The method operates by deploying a converged networking and computing device at a service location, downloading a virtual machine to the converged networking and computing device, activating the virtual machine by a service in the wide area network, and connecting the virtual machine to a provisioned network path over the wide area network. Different virtual machines can be deployed to different locations. The same virtual machine can be deployed to different locations. Moreover, more than one virtual machine may be deployed to more than one service location.

20 Claims, 10 Drawing Sheets

(56) References Cited

U.S. PATENT DOCUMENTS

| | | | |
|---|---|---|---|
| 2013/0061219 A1 | 3/2013 | Jerbi et al. | |
| 2014/0068599 A1* | 3/2014 | Kannan | G06F 8/61 718/1 |
| 2014/0229620 A1* | 8/2014 | Horman | H04L 47/783 709/226 |

OTHER PUBLICATIONS

"Networks_Functions_Virtualisation.pdf", Peter Willis, Andy Reid, CIO Summit 2013.

International Search Report and Written Opinion—PCT/US2014/061107—ISA/US—Feb. 6, 2015.

* cited by examiner

METHOD AND APPARATUS FOR PROVISIONING A VIRTUAL MACHINE (VM) FROM A NETWORK SERVICE PROVIDER

FIELD OF DISCLOSURE

Aspects of the present disclosure relate generally to provisioning of computing and networking resources, and more particularly, to provisioning computing and networking resources to an enterprise and/or a consumer of network services. Additionally, aspects of the present disclosure relate generally distribution of virtual machines using networks.

BACKGROUND

Many companies provide public and private cloud services. Such companies include Rackspace®, Google®, Amazon®, Microsoft Azure®, and the like. Enterprises such as financial institutions, banks, law firms, manufacturers, and the like may wish to lease datacenter resources from cloud providers. The cloud infrastructure providers allow the enterprises to run their computing equipment within the cloud infrastructure provider facility. This is commonly called a hosted data center solution.

In many cases, the hosted or cloud data center consists of virtualized compute, storage, and network resources. In order to create desired functionality in a virtualized environment, it is often required that software functionality be transferred, installed, managed, and operated in the form of a virtual machine (VM). Virtual machines are files that contain operating system, software, and data, and are the virtual equivalent of a physical compute resource implementing an application or function. Companies are increasingly using the virtual machine format as a way to commercialize their technology, and products embodied as virtual machines are essential large (typically one gigabyte or more) data files (content) that are licensed for use by an end user. Unfortunately, since these virtual machines can be quite large, the distribution of these files from producers to consumers can be difficult, time consuming, and expensive. Inability to rapidly distribute virtual machines also impairs the ability to consume or use the virtual machine, especially for short time duration uses.

Thus, improved apparatuses and methods for provisioning computing resources are desired.

SUMMARY

Exemplary implementations of the invention are directed to a mechanism for provisioning one or more virtual machines (VMs) from a network service provider. The mechanism operates by deploying a converged networking and computing device at a service location, downloading a virtual machine to the converged networking and computing device, activating the virtual machine by a service in the wide area network, and connecting the virtual machine to a provisioned network path over the wide area network. Different virtual machines can be deployed to different locations. The same virtual machine can be deployed to different locations. Moreover, more than one virtual machine may be deployed to more than one service location.

BRIEF DESCRIPTION OF THE DRAWINGS

The accompanying drawings are presented to aid in the description of implementations of the invention and are provided solely for illustration of the implementations and not limitation thereof.

DETAILED DESCRIPTION

Figure 1:
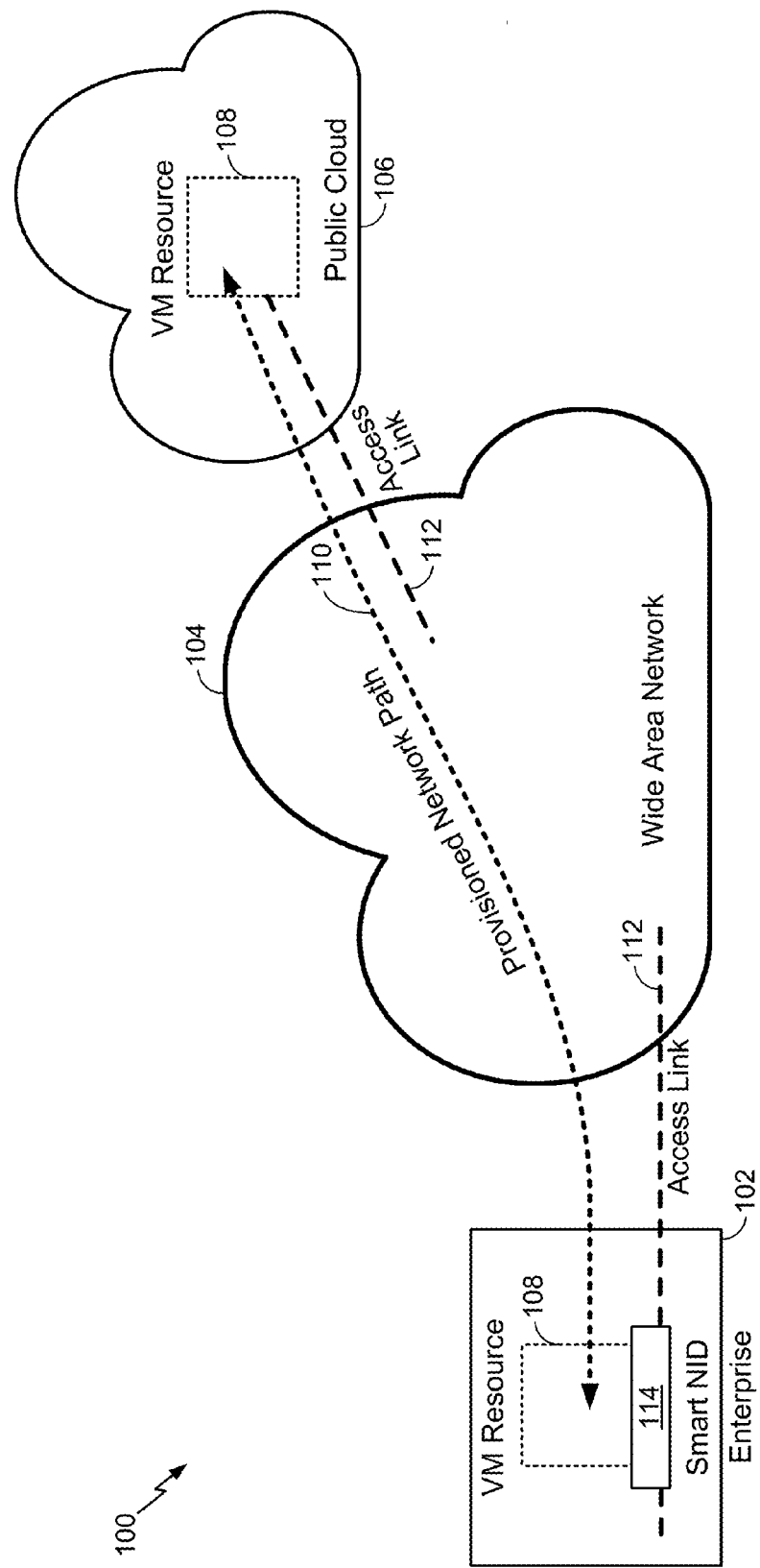
FIG. 1 illustrates an environment that is suitable for provisioning a virtual machine (VM) from a network service provider according to at least one implementation.

Aspects of the invention are disclosed in the following description and related drawings directed to specific implementations of the invention. Alternative implementations may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any implementation described herein as "exemplary" is not necessarily to be construed as preferred or advantageous over other implementations. Likewise, the term "implementations of the invention" does not require that all implementations of the invention include the discussed feature, advantage, or mode of operation.

The terminology used herein is for the purpose of describing particular implementations only and is not intended to be limiting of implementations of the invention. As used herein, the singular forms "a," "an," and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many implementations are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the implementations described herein, the corresponding form of any such implementations may be described herein as, for example, "logic configured to" perform the described action.

Enterprises have commonly leased wide area network (WAN) bandwidth services (private lines) to enable interconnection of their data centers and corporate offices to address new computing, storage, and general information technology (IT) requirements. Enterprises purchase and deploy application-enabling equipment, software, and services in conjunction with these WAN services, and the total expense incurred to address the business requirement is amortized over the life of the solution (typically a few years).

The emergence of public and private cloud service providers, such Amazon and

Rackspace, or internet content providers, such as video content, Google, Verizon® Terremark®, CenturyLink® Savvis®, AT&T®, etc., (termed herein "cloud service providers") has fundamentally changed the nature of wide area service requirements to enterprises. For example, service characteristics have changed, bandwidth demands are highly variable and often require very high speed service rates, low latency and low error rates, and connectivity end points are dynamic and follow the cloud service provider. In many cases, it is neither feasible nor acceptable to require several months of set up time in order to facilitate a one-time large data file transfer into a specific cloud service provider requiring only a few hours of dedicated service.

Public cloud service providers provide access to affordable large scale computing and storage resources by enterprises with the caveat that custom hardware solutions are not available on the cloud service providers' infrastructure. Any unique capabilities required by the enterprise to make use of the public cloud service providers' infrastructure tends to be delivered into the cloud as software in the form of a virtual machine that is compatible with a generic infrastructure. This limitation is forcing the transition from custom hardware/software based enterprise application equipment into software-only VM-based products that are cloud-compatible.

Virtual machines have emerged as a convenient and effective means to deliver applications and functionality to end users. A virtual machine is the virtual equivalent of a physical machine, and comprises all the information needed to transform a generic compute resource into a specific function, including operating system, software, and data. A virtual machine is simply a large data file that is loaded onto a generic computer running a suitable hypervisor (like VMWare, KVM, XEN, or the like). Increasingly, companies that produce products for use in datacenters like load balancers, WAN optimizers, firewalls, security appliances etc., are transforming their products from physical to virtual, and producing virtual machines that embody their specific capabilities. Virtual machines can be very large files, typically at least a gigabyte and often times larger. As a result, virtual machines can be somewhat time consuming to obtain using typically available networking technologies due to the large file sizes.

The emergence of cloud datacenter providers, the virtualization of data center resources, and the increasing use of the virtual machine structure for implementation and delivery of technology to enterprises has created a need for a flexible, fast, and reliable mechanism for distribution of virtual machines between producers of virtual machines and consumers of virtual machines.

Wide area network providers may use their high-speed network infrastructure to deliver one or more virtual machines to one or more service locations, facilitating the use of the virtual machines in any location served by a wide area network. The wide area network provider may also deliver the virtual machine in-band to further optimize the delivery of the virtual machine, reducing the time required to transfer and activate the virtual machine. The wide area provider may remotely configure for use and remotely control the virtual machine, and may additionally configure network resource(s) to facilitate interconnection of the virtual machines, the wide area network, and local area networks. By combining a virtual machine resource with networking equipment, particularly networking equipment used and deployed at or near customer premises, the wide area network provider may deploy virtual machines in locations where it may be most advantageous for the operation of the virtual machine. The wide area network provider may also reconfigure network connectivity in order to shorten the time required to distribute a virtual machine, further benefiting the consumption of the virtual machine. After the virtual machines have been transferred across the provisioned network resource, the network may be reconfigured to enable end user bandwidth use. The wide area network provider may optionally allow the control and configuration of the virtual machine by the end user. The wide area network provider may optionally partition the virtual machine resource for use in part by an end user and also in part by the wide area network provider, allowing virtual machines to be installed, configured, and operated by each party. The wide area network provider may partition some or all of a virtual machine resource for use by a third party, allowing virtual machines to be deployed, configured and used as part of a service offered by the third party.

One or more wide area network providers may jointly provide network resources and/or virtual machine resources in order to enable connectivity and/or access to virtual machine resources in service locations not reachable by a single wide area service provider.

Wide area network providers may also deploy, configure and control virtual machines deployed in cloud infrastructures provided they are able to access the virtual machine resource.

Service points where virtual machine resources are available may be anywhere reachable by the wide area network provider, and include end user locations such as data centers, corporate head offices, regional and remote offices, public and private cloud data centers, and wide area network locations such as central offices, aggregation points, and utility closets in multi-tenant buildings.

In one or more implementations, the wide area service provider may utilize high-speed Ethernet technology to access service locations for the deployment of virtual machines, typically based on Gigabit Ethernet or 10 Gigabit Ethernet. However, other types of network technology may be used provided the distribution of virtual machines occurs in an acceptable time frame for the end user of the wide area service.

Provisioning of computing resources according to one or more aspects utilizes high bandwidth, low latency, low packet error rate, and on-demand data networking services to enterprises, permitting enterprises to obtain and deploy virtual machines in compute facilities rapidly and on demand. In other aspects, the network operator may deploy compute resources as hosts for virtual machines whereby the network operator may provide access to the virtual machine to the end user. In some circumstances, an optimized network/computing device may be deployed in or in close proximity to the premises of the end user such that capabilities embodied in virtual machines may be deployed more directly located in proximity to the end user. Such a configuration may offer advantages in contrast to virtual machines deployed in a remote location.

FIG. 1 illustrates an environment that 100 is suitable for implementing a mechanism for provisioning a virtual machine (VM) from a network service provider according to at least one implementation. In one or more implementations, the environment 100 includes networking capabilities such as the ability to assign/lease network resources on an on-demand basis.

As used herein, "network resources" and/or "computing resources" can be services such as archive services, backup services, cloud security services, bandwidth, storage, encryption services, WAN optimization, dynamic performance on-demand services, availability services, data move services, data cache services, and the like. The environment 100 also is suitable for deploying applications in the form of virtual machines into a public cloud or a private cloud on demand. In one or more implementations, the environment 100 uses a network service provider to distribute virtual machines to enterprises.

The illustrated environment 100 includes an enterprise 102. In one or more implementations, the enterprise 102 may be one or more financial institutions, banks, law firms, manufacturers, and the like. The illustrated enterprise 102 may be any enterprise location where wide area network services terminate. For example, the illustrated enterprise 102 may be a data center, which may be a hosted or cloud data center that includes virtualized compute, storage, and network resources.

The illustrated environment 100 includes a wide area network 104. The illustrated wide area network 104 can be operated by one or more organizations (service providers) that provide connectivity to a person or another organization, using wired or wireless connections. Suitable organizations include, for example, commercial, community-owned, non-profit, or otherwise privately owned network service providers, a virtual private network (VPN), a regional wireless area network, a metropolitan wireless area network, or the like. In one or more implementations, a network service provider is a public network service provider that provides wide area connectivity using high speed Gigabit Ethernet technology (e.g., AT&T®) or a network service provider that provides broadband network connectivity via cable modem (e.g., Comcast®.)

The illustrated environment 100 includes a public cloud facility 106. Examples of public cloud facilities include Citrix®, Amazon Web Services®, Microsoft® Azure®, Google Drive®, Rackspace®, VMWare®, and the like.

The illustrated public cloud facility 106, as well as the enterprise 102, includes the virtual machine (VM) resource 108. In one or more implementations, the virtual machine resource 108 is a pool of compute, storage, and network capabilities. The virtual machine resource 108 may have the ability to deploy functionality in the form of virtual machines. Virtual machine resources suitable for implementing the VM resource 108 include load balancers, WAN optimizers, firewalls, security appliances, and the like.

The illustrated environment 100 includes a provisioned network path 110, which is a data connection provided by a service provider in the wide area network 104 between enterprise 102 and the public cloud facility 106. The network service provider provides high-speed networking technologies to enable access to connections from the enterprise 102 to the wide area network 104 infrastructure. Similarly the network service provider provides high-speed networking technologies to enable access to connections from the enterprise 102 to the public cloud facility 106. In one or more implementations, the enterprise 102 may lease resources from a service provider in the wide area network 104 as well as a service provider in the public cloud facility 106. Such resources may include VM resource 108.

The illustrated environment 100 includes an access link 112, which may implement high-speed Ethernet technology to access service locations for the deployment of virtual machines, typically based on Gigabit Ethernet or 10 Gigabit Ethernet. However, other types of network technology may be used to implement the access link 112 provided the distribution of virtual machines occurs in an acceptable time frame for the end user of the wide area service.

The illustrated environment 100 includes a smart network interface device (NID) 114 that is associated with the VM resource 108. The smart NID 114 may be any suitable carrier Ethernet networking device that is capable of hosting virtual machines, such as an Ethernet customer premise device.

Figure 2:
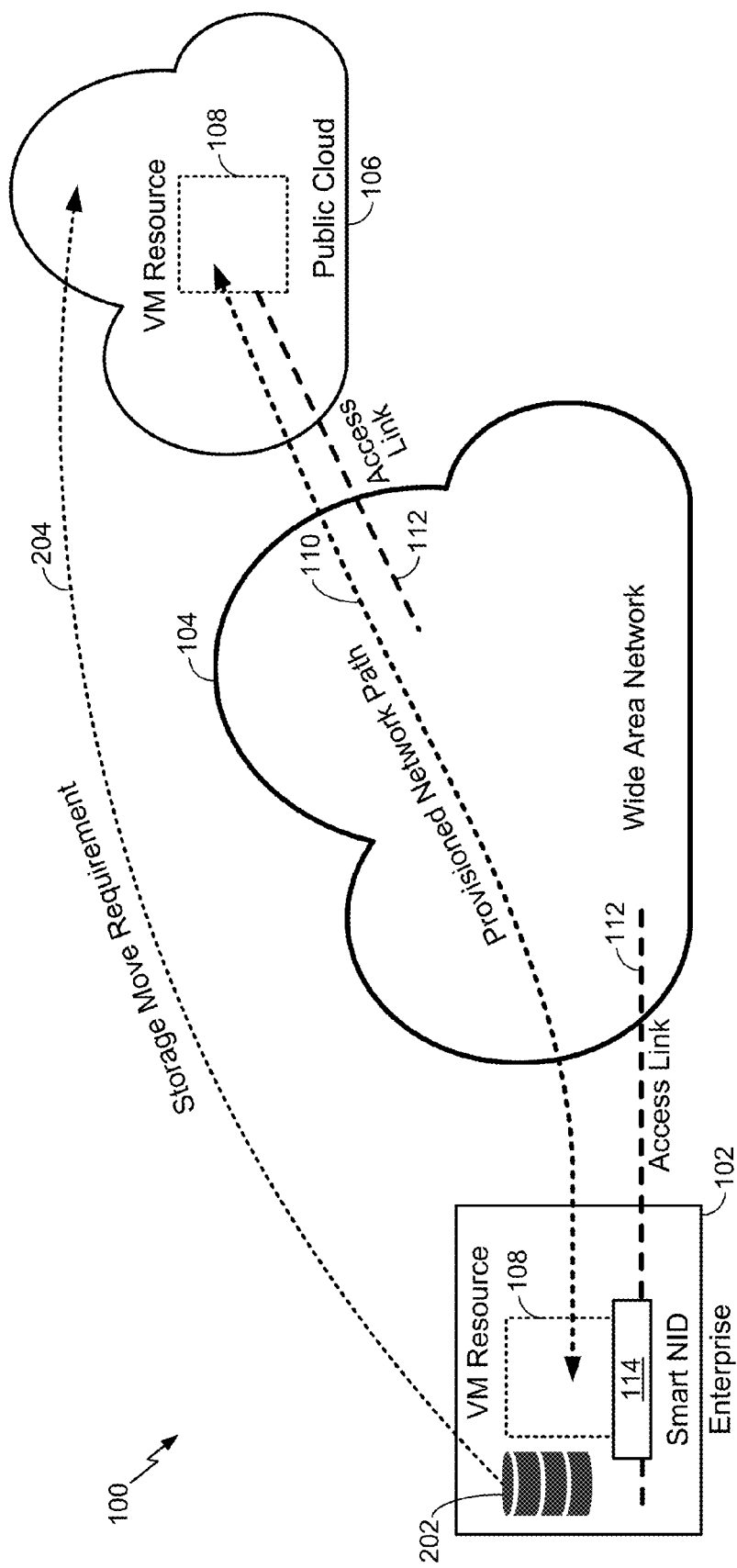
FIG. 2 illustrates a configuration of the environment depicted in FIG. 1 when an enterprise wishes to transfer a large storage volume from a local data center to a remote public cloud facility according to at least one implementation.

FIG. 2 illustrates a configuration of the environment 100 in which the enterprise 102 is to transfer a large storage volume from a local storage 202 to the public cloud facility 106 according to at least one implementation. In order to accomplish the transfer of the large storage volume from the storage 202 to the remote public cloud facility 106, the virtual machine resource 108 may be a WAN optimization networking appliance located at both the enterprise 102 and the public cloud facility 106. In the illustrated implementation, the desired transfer of the large storage volume from the storage 202 to the remote public cloud facility 106 is depicted by dotted arrow 204. The storage 202 is described in more detail below with reference to FIG. 3.

Figure 3:
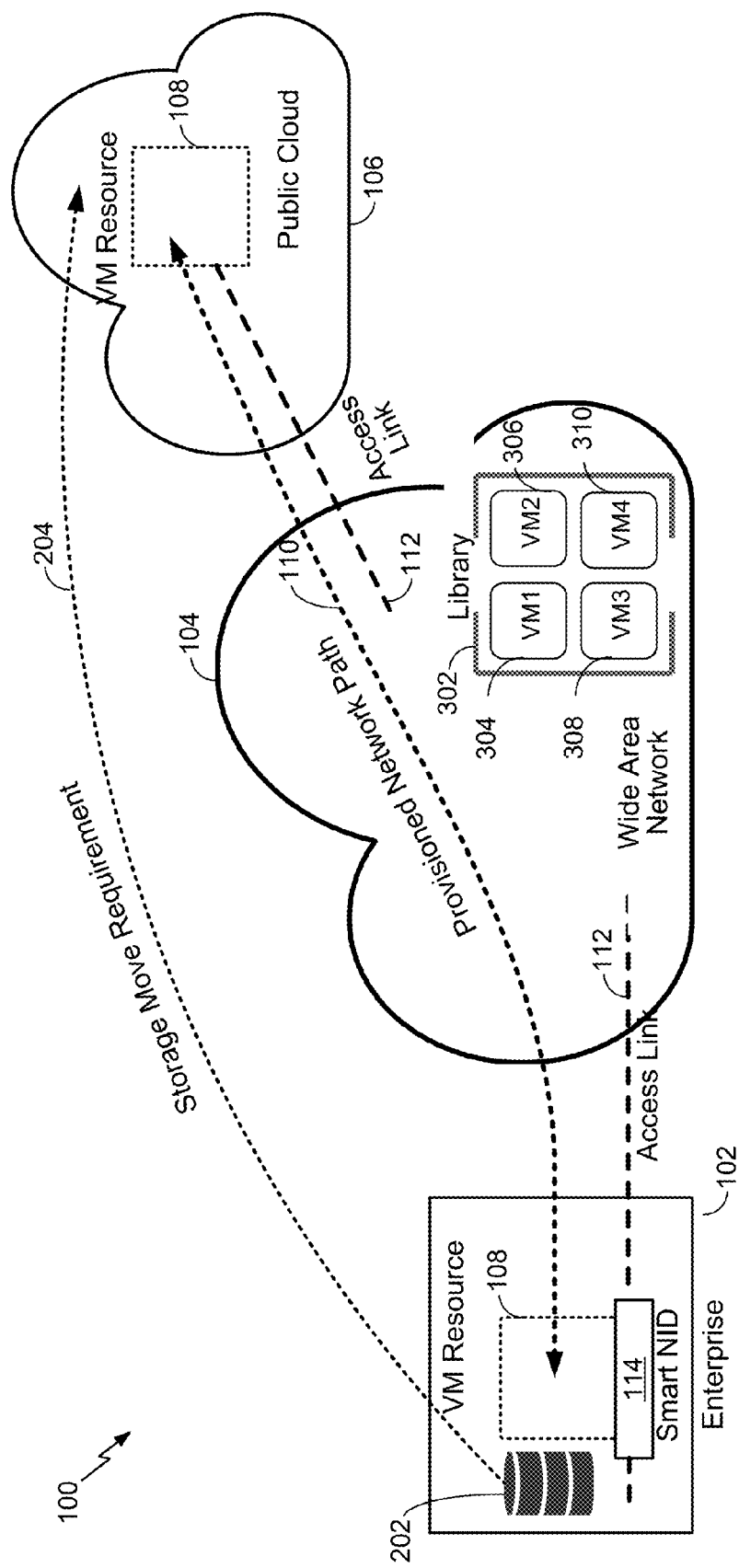
FIG. 3 illustrates a configuration of the environment depicted in FIG. 1 when an enterprise and/or network service provider identifies a suitable virtual machine according to at least one implementation.

FIG. 3 illustrates a configuration of the environment 100 when the enterprise 102, network service provider in the wide area network 104 and/or the public cloud facility 106 identifies a suitable virtual machine according to at least one implementation. The environment 100 illustrated in FIG. 3 includes a library 302, which may be configured to store multiple inactive virtual machine images that have been prepared for distribution. For example, the illustrated library 302 includes four virtual machines VM1 304, VM2 306, VM3, 308, and VM4 310. At least one of the four virtual machines VM1 304, VM2 306, VM3, 308, and VM4 310 is a WAN optimization networking appliance needed for deployment to the enterprise 102 in virtual machine resource 108. Although illustrated as including only four virtual machines VM1 304, VM2 306, VM3, 308, and VM4 310, the library 302 typically can include hundreds, thousands, etc., of virtual machines.

In one or more implementations, the environment 100 depicted in FIG. 3 is configured to execute the desired transfer of the large storage volume from the storage 202 to the remote public cloud facility 106. For purposes of explanation, assume that the VM3 308 is a WAN optimization virtual machine. VM2 306 also may be a WAN optimization virtual machine.

Figure 4:
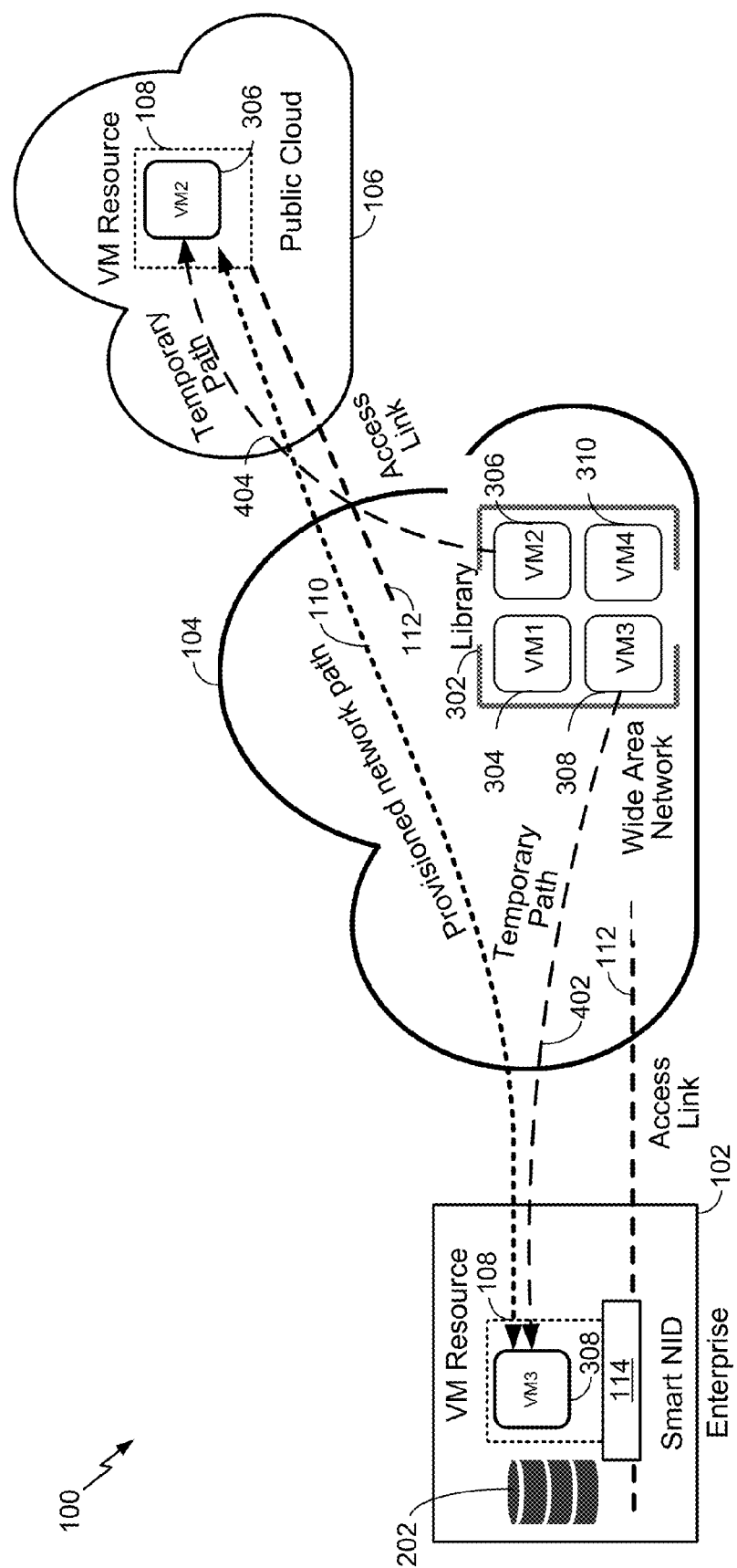
FIG. 4 illustrates a configuration of the environment depicted in FIG. 1 when a network service provider reconfigures network connectivity to enable high speed transfer of two different virtual machines from a central library to two different end point locations according to at least one implementation.

FIG. 4 illustrates a configuration of the environment 100 when a network service provider in the wide area network 104 reconfigures network connectivity to enable high speed transfer of two different virtual machines from the storage 302 to desired end point locations (enterprise 102 and public cloud facility 106) using temporary network paths 402 and 404, respectively, according to at least one implementation. It will be understood that a virtual machine resource may host any number of virtual machines simultaneously as is supported by the available compute capability.

In this illustration VM3 308 has been selected for use by the end user, to be deployed and activated in the virtual machine resource 108 deployed at the enterprise 102. Similarly, VM2 306 has been selected for deployment and activation by the end user, to be deployed in the virtual machine resource 108 in the public cloud 106. Additional virtual machine selections could be made, and additional virtual machines could be deployed in those locations at the discretion of the end user depending on overall requirements. The service provider provisions the temporary paths 402 and 404 to facilitate transfer of the virtual machine images in an acceptable time frame, and then the temporary paths 402 and 404 may be removed or de-provisioned.

In the illustrated implementation, the network service provider in the wide area network 106 reconfigures the network connectivity (original provisioned network path 110) to enable high speed transfer of the VM3 308 from the library 302 to the enterprise 102. The network service provider in the wide area network 106 also reconfigures the network connectivity (original provisioned network path 110) to enable high speed transfer of the VM3 308 from the library 302 to the public cloud facility 106.

For example, instead of transferring VM3 308 from the network service provider in the wide area network 104 to the enterprise 102 and VM2 306 from the network service provider in the wide area network 104 to the public cloud facility 106 via the normal provisioned network path 110, the network service provider in the wide area network 104 transfers VM3 308 from the network service provider in the wide area network 104 to the enterprise 102 and VM2 306 from the network service provider in the wide area network 104 to the public cloud facility 106 via temporary path 402 and temporary path 404, respectively. Once VM3 308 and VM2 306 are transferred, activated, and configured by network service provider in the wide area network 104, the network connectivity is returned to its normal configuration in which the normal provisioning path is the provisioned network path 110.

Figure 5:
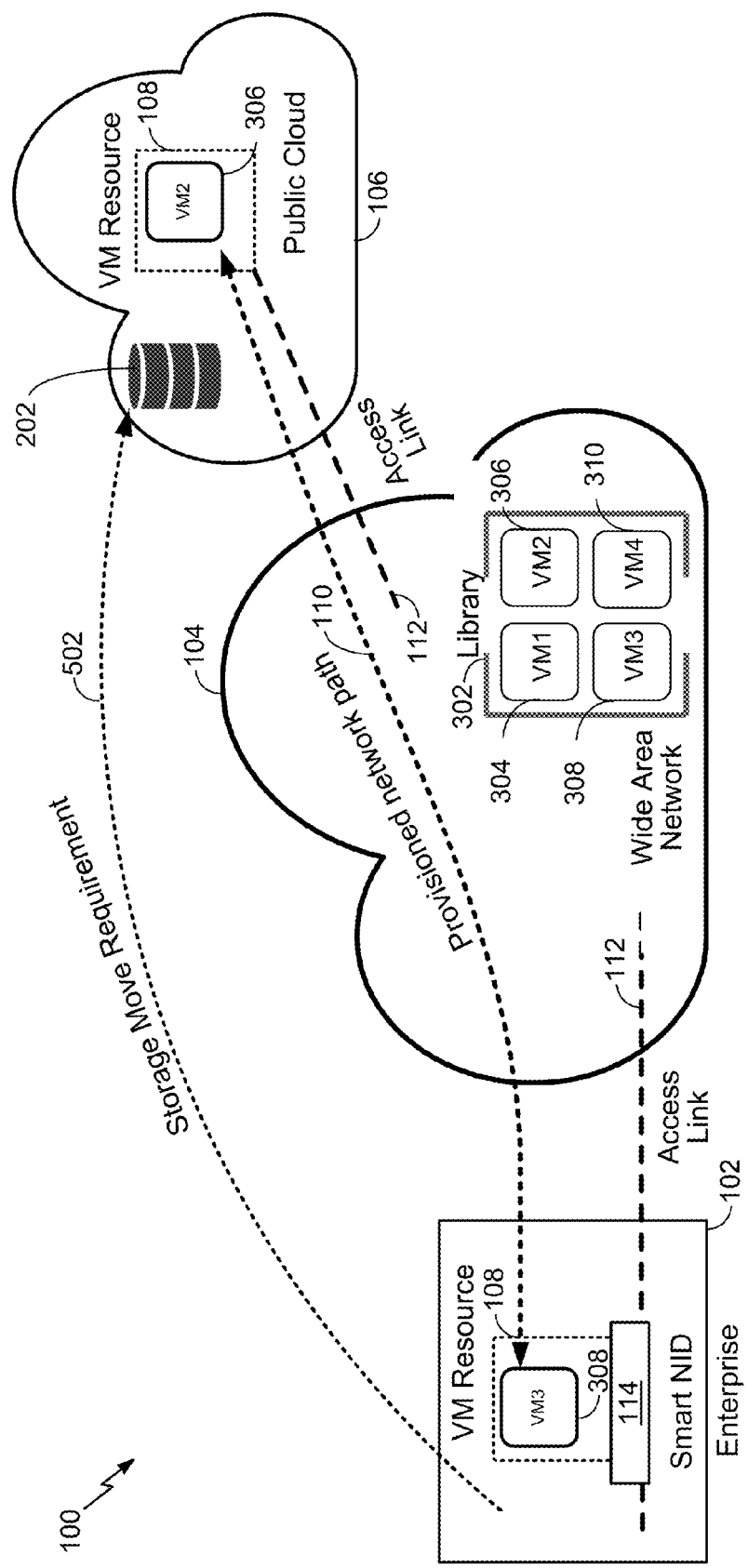
FIG. 5 illustrates a configuration of the environment depicted in FIG. 1 when transferring a large storage volume from storage in an enterprise data center to a remote public cloud facility according to at least one implementation.

FIG. 5 illustrates a configuration of the environment 100 when transferring a large storage volume from storage 202 in the enterprise 102 to remote public cloud facility 106 according to at least one implementation. FIG. 5 shows that the storage 202 is now located at the public cloud storage facility 106. FIG. 5 also shows that the network service provider in the wide area network 104 has released the temporary paths 402 and 404, and only the normal provisioned network path 110 is available. At this point the WAN optimization virtual machines VM3 308 and VM2 306 can be deactivated and the enterprise 102 can be billed for the uses of the WAN optimization virtual machines VM3 308 and VM2 306.

Figure 6:
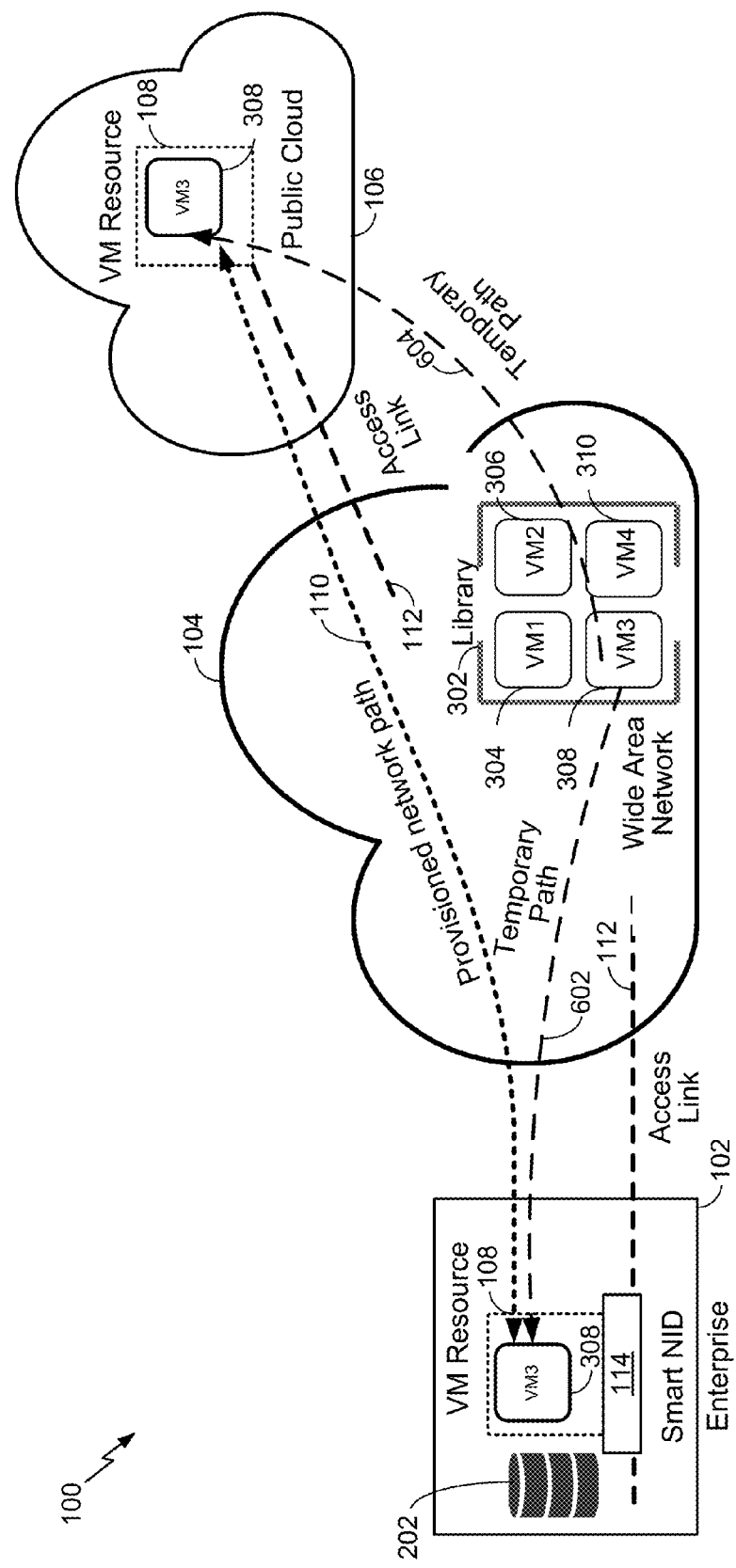
FIG. 6 illustrates a configuration of the environment depicted in FIG. 1 when a network service provider reconfigures network connectivity to enable high speed transfer of the same virtual machines from a central library to two different end point locations according to at least one implementation.

FIG. 6 illustrates a configuration of the environment 100 when a network service provider in the wide area network 104 reconfigures network connectivity to enable high speed transfer of the same virtual machine (VM3 308) from the library 302 to desired end point locations (enterprise 102 and public cloud facility 106) using temporary network paths 602 and 604, respectively, according to at least one implementation. FIG. 6 illustrates a configuration of the environment 100 when transferring a large storage volume from storage 202 in the enterprise 102 to remote public cloud facility 106 according to at least one implementation.

In the implementation shown in FIG. 6, the network service provider in the wide area network 104 can later release the temporary paths 602 and 604 when VM3 308 is deactivated (i.e., after the storage 202 has been transferred) so that only the normal provisioned network path 110 is available. At this point the WAN optimization virtual machine VM3 308 the enterprise 102 can be billed for the uses of the WAN optimization virtual machine VM3 308.

Figure 7:
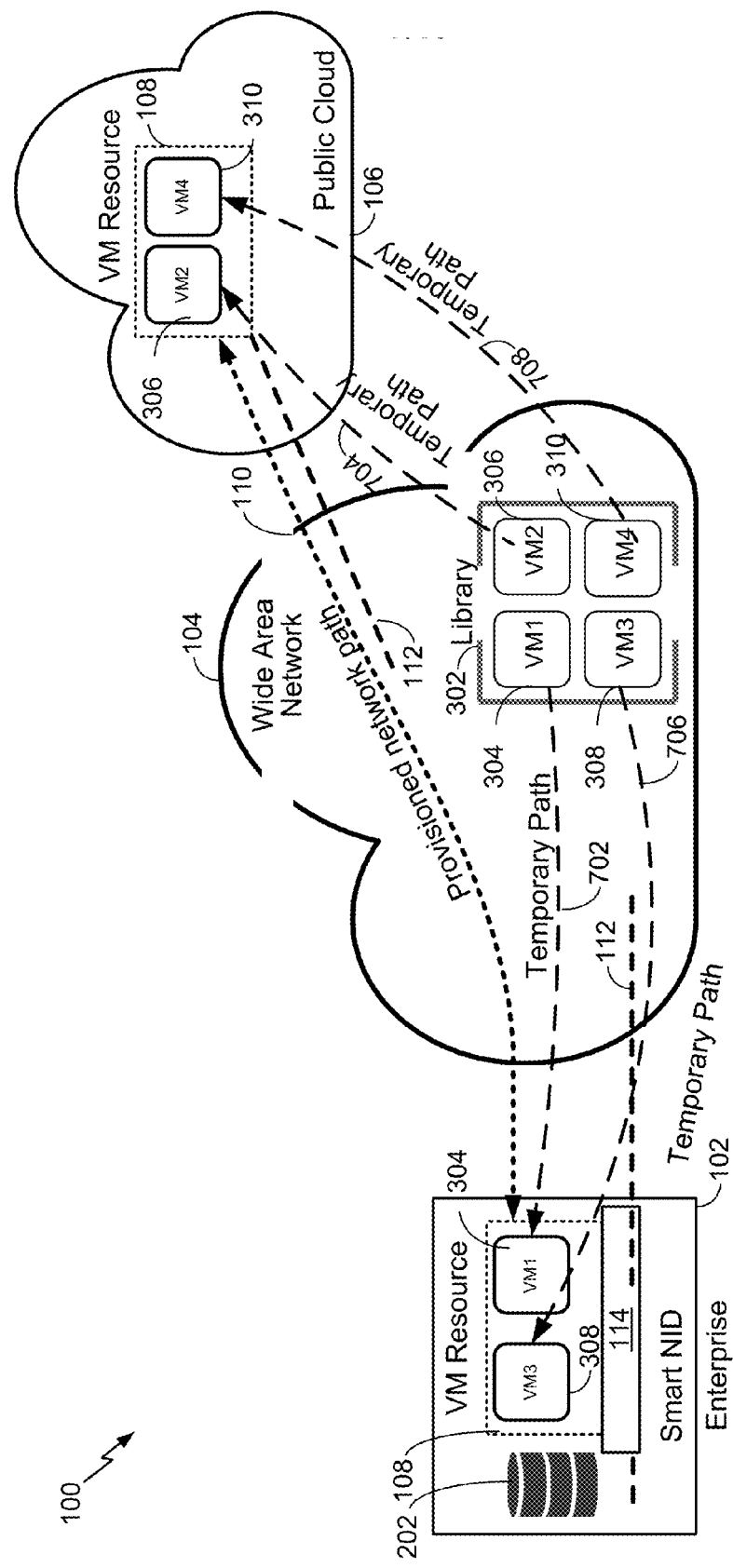
FIG. 7 illustrates a configuration of the environment depicted in FIG. 1 when a network service provider reconfigures network connectivity to enable high speed transfer of the two different virtual machines from a central library to one endpoint location and two different virtual machines to another end point location according to at least one implementation.

FIG. 7 illustrates a configuration of the environment 100 when a network service provider in the wide area network 104 reconfigures network connectivity to enable high speed transfer of the two different virtual machines (VM1 304 and VM3 308) from the library 302 to one desired end point location (enterprise 102) and two different virtual machines VM2 306 and VM4 310) from the library 302 to another desired end point location (public cloud facility 106) using temporary network paths 702, 706, 704, and 708, respectively, according to at least one implementation. FIG. 6 illustrates a configuration of the environment 100 when transferring a large storage volume from storage 202 in the enterprise 102 to remote public cloud facility 106 according to at least one implementation.

In the implementation shown in FIG. 7, the network service provider in the wide area network 104 can later release the temporary paths 602 and 604 when VM3 308 is deactivated (i.e., after the storage 202 has been transferred) so that only the normal provisioned network path 110 is available. At this point the WAN optimization virtual machine VM3 308 the enterprise 102 can be billed for the uses of the WAN optimization virtual machine VM3 308.

Figure 8:
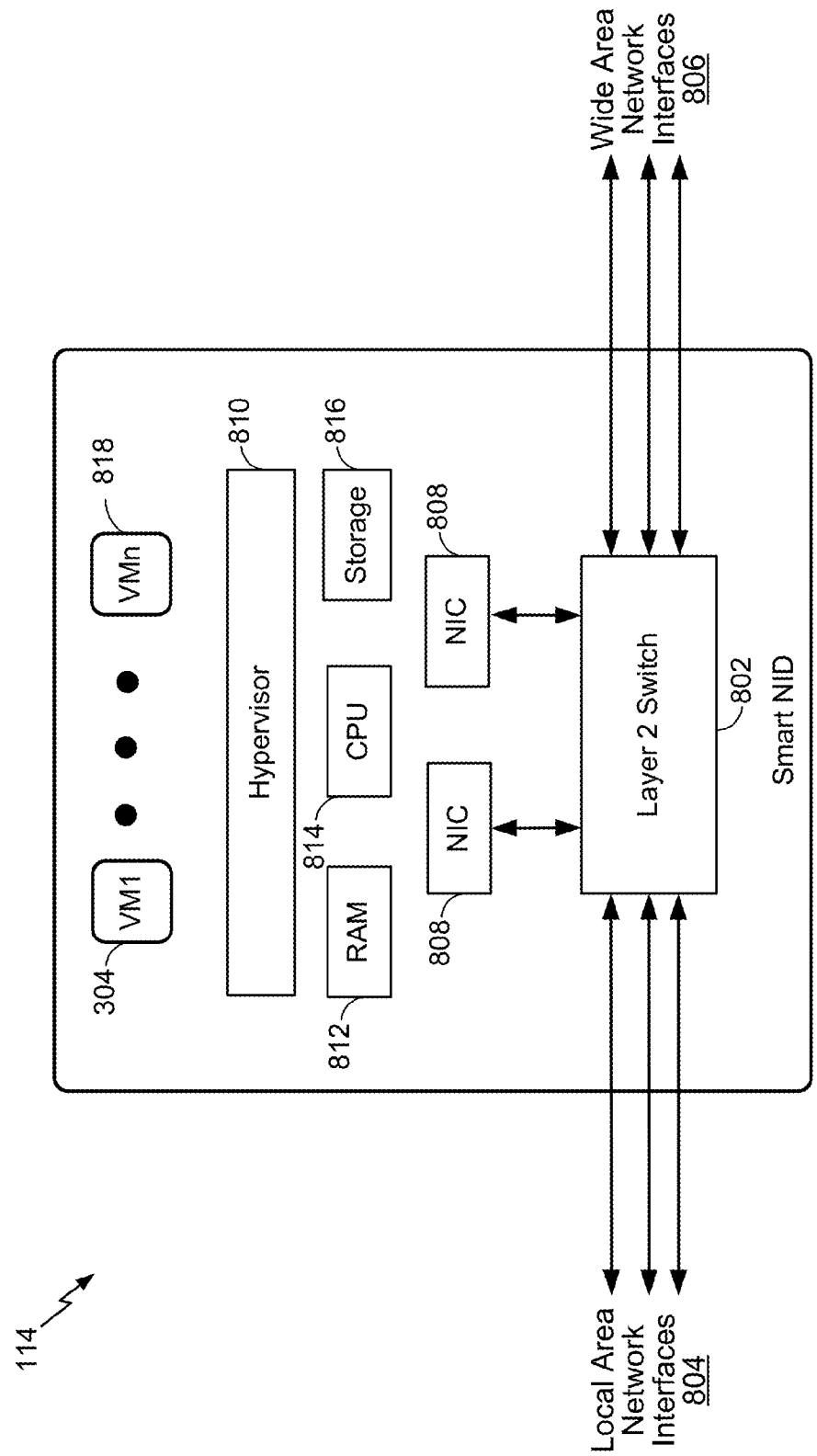
FIG. 8 illustrates a block diagram of the smart network interface device (smart NID) depicted in FIG. 1 according to at least one implementation.

FIG. 8 illustrates an example of a combined networking and computing device that may be used by a service provider to provide both network services and virtual machine appliance services. In the illustrated implementation, the combined networking and computing device is the Smart NID 114, which includes a Layer 2 switch 802, communications with local area network (LAN) interfaces 804, wide area network (WAN) interfaces 806, two network interface cards (NICs 808), a hypervisor 810, random access memory (RAM) 812, a central processing unit (CPU) 814, storage 816, and several virtual machines (VM1 308 through VMn 818) that are associated with the smart NID 114.

In one or more implementations, the smart NID 114 is the combination of a layer 2 Ethernet services NID and a compute complex typically consisting of an Ethernet switching device for creating and managing the connectivity between a local area network and a wide area network, and an integrated x86 based server which provides the resource necessary for hosting virtual machines. The switching capacity, number of switch ports, and server capacity may all vary depending on the service requirements. Generally network traffic that requires redirection to the virtual machine for processing is connected to the server through physical network connections between the packet switching device and one or more Network Interface Card (NIC) 808 associated with the server. Packet traffic is then forwarded internally in the server to the virtual machine. In some cases, the server complex may include packet processing hardware to accelerate the performance of the server and associated virtual machines.

Figure 9:
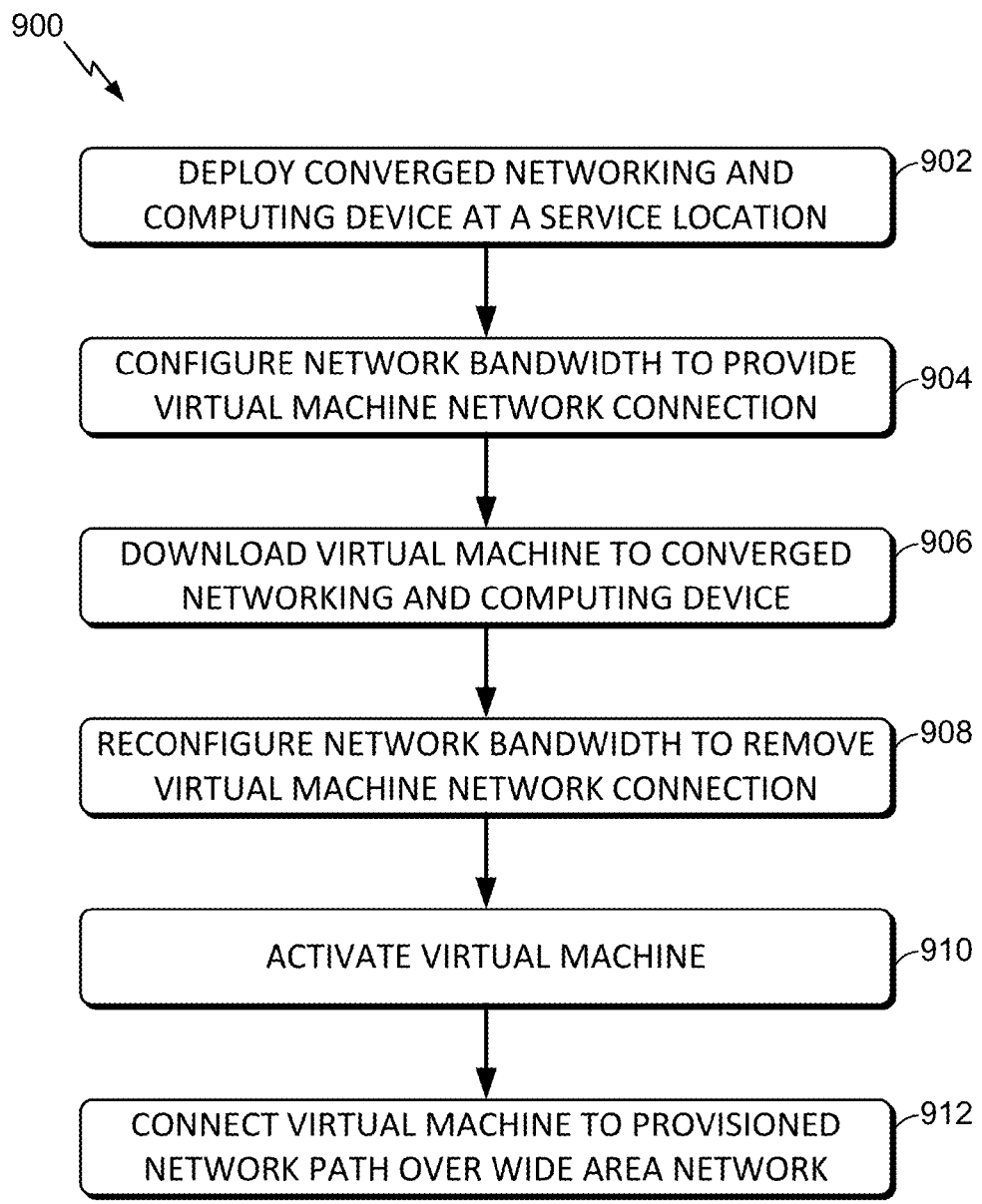
FIG. 9 is a flowchart of how the environment depicted in FIG. 1 operates according to one or more implementations described herein.

FIG. 9 is a flowchart of a method 900 illustrating how the environment 100 operates according to one or more implementations described herein. In a block 902, the method 900 deploys a converged networking and computing device at a service location. In a block 904, the method 900 configures network bandwidth to provide a virtual machine network connection. In a block 906, the method 900 downloads a virtual machine to the converged networking and computing device. In a block 908, the method 900 reconfigures network bandwidth to remove the virtual machine network connection. In a block 910, the method 900 activates the virtual machine. In a block 912, the method 900 connects the virtual machine to a provisioned network path over a wide area network.

Figure 10:
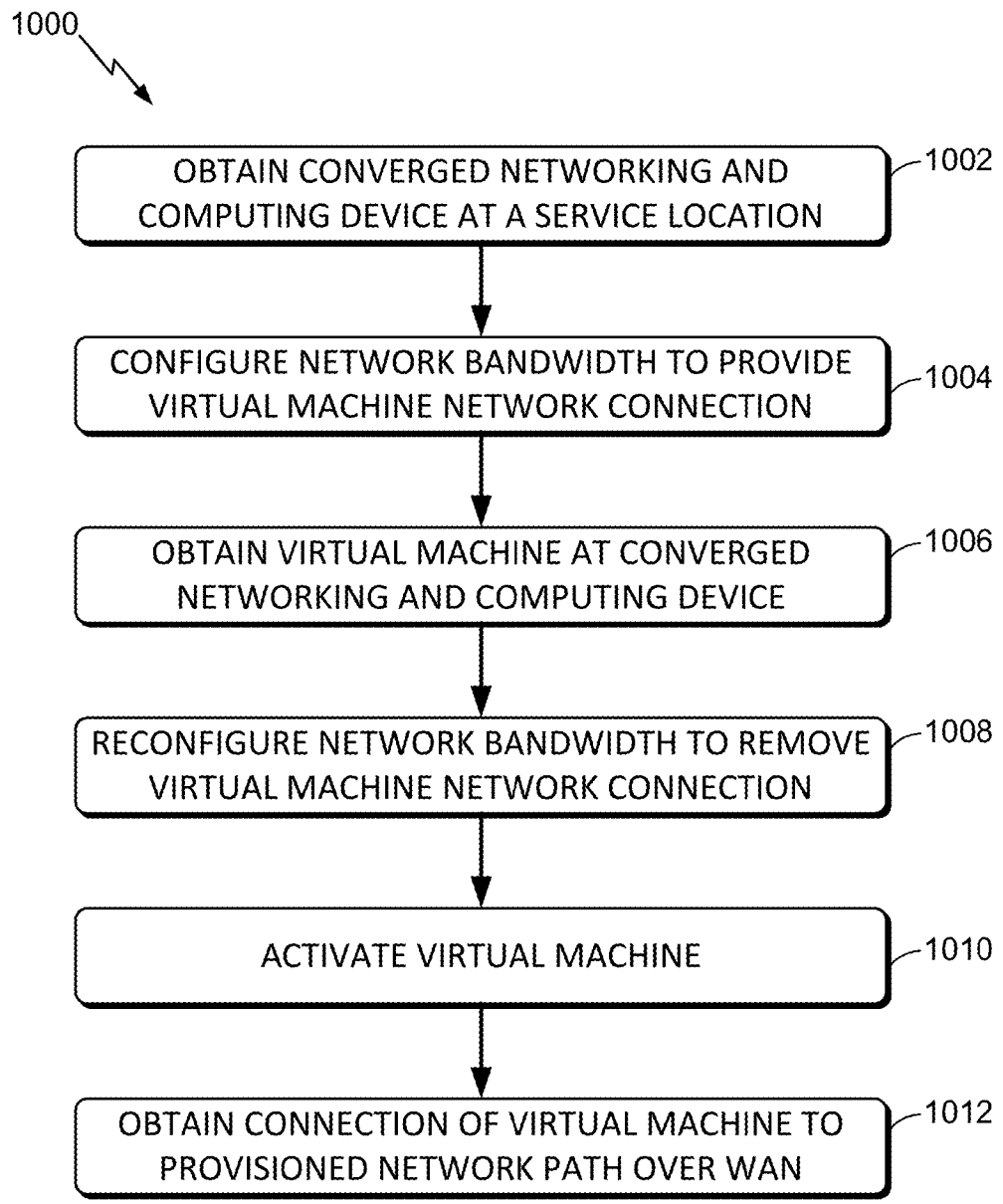
FIG. 10 is a flowchart of how the environment depicted in FIG. 1 operates according to one or more alternative implementations described herein.

FIG. 10 is a flowchart of a method 1000 illustrating how the environment depicted in 100 operates according to one or more alternative implementations described herein. In a block 1002, the method 1002 obtains a converged networking and computing device at a service location. In a block 1004, the method 1000 configures network bandwidth to provide a virtual machine network connection. In a block 1006, the method 1000 obtains a virtual machine at the converged networking and computing device. In a block 1008, the method 1000 reconfigures network bandwidth to remove the virtual machine network connection. In a block 1010, the method 1000 activates the virtual machine. In a block 1012, the method 1000 obtains a connection to the virtual machine to a provisioned network path over a wide area network.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences, and/or algorithms described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an implementation of the invention can include a computer readable media embodying a method for providing virtual network functions to an enterprise. Accordingly, the invention is not limited to illustrated examples and any means for performing the functionality described herein are included in implementations of the invention.

While the foregoing disclosure shows illustrative implementations of the invention, it should be noted that various changes and modifications could be made herein without departing from the scope of the invention as defined by the appended claims. The functions, steps, and/or actions of the method claims in accordance with the implementations of the invention described herein need not be performed in any particular order. Furthermore, although elements of the invention may be described or claimed in the singular, the plural is contemplated unless limitation to the singular is explicitly stated.

What is claimed is:

1. A method for deployment by a wide area service provider of one or more virtual machines via a wide area network, comprising:
   deploying a converged networking and computing device at a service location with a provisioned network path in the wide area network;
   downloading a virtual machine to the converged networking and computing device over a temporary network path reconfigured from the provisioned network path over the wide area network, wherein the temporary network path has a different end point than the provisioned network path;
   activating the virtual machine by a service in the wide area network; and
   connecting the virtual machine to the provisioned network path over the wide area network and removing the temporary network path.

2. The method of claim 1, further comprising configuring network bandwidth to provide a virtual machine distribution connection for distribution of a virtual machine.

3. The method of claim 2, further comprising reconfiguring network bandwidth to remove the virtual machine distribution connection.

4. The method of claim 1, wherein the virtual machine distribution connection is a high speed connection.

5. The method of claim 1, wherein activating the virtual machine includes booting and configuring the virtual machine.

6. The method of claim 1, wherein the virtual machine is obtained from a network-connected storage device.

7. The method of claim 1, wherein the network-connected storage device is located remote from the service location.

8. The method of claim 1, wherein the network-connected storage device is located in the wide area network.

9. A method for deployment of one or more virtual machines using a wide area network, comprising:
   obtaining a converged networking and computing device at a service location with a provisioned network path in the wide area network;

obtaining a virtual machine at the converged networking and computing device over a temporary network path reconfigured from the provisioned network path over the wide area network, wherein the temporary network path has a different end point than the provisioned network path;

activating the virtual machine; and obtaining a connection to the virtual machine at the service location using the provisioned network path over the wide area network and removing the temporary network path.

10. The method of claim 9, further comprising configuring network bandwidth to facilitate a virtual machine distribution connection for distribution of the virtual machine.

11. The method of claim 10, further comprising reconfiguring network bandwidth to facilitate removal of the virtual machine distribution connection.

12. The method of claim 9, wherein the virtual machine distribution connection is a high speed connection.

13. The method of claim 9, wherein activating the virtual machine includes facilitating of booting and configuring the virtual machine.

14. The method of claim 9, wherein the virtual machine is obtained from a network-connected storage device.

15. The method of claim 9, wherein the network-connected storage device is located remote from the service location.

16. A method for deployment of one or more virtual machines via a wide area network, comprising:

facilitating deployment of a converged networking and computing device at a service location with a provisioned network path in the wide area network;

facilitating downloading of a virtual machine to the converged networking and computing device over a temporary network path reconfigured from the provisioned network path over the wide area network, wherein the temporary network path has a different end point than the provisioned network path;

facilitating activation of the virtual machine by a service in the wide area network; and facilitating connection of the virtual machine at the service location to the provisioned network path over the wide area network and removing the temporary network path.

17. The method of claim 16, further comprising facilitating configuring network bandwidth to provide a virtual machine distribution connection for distribution of a virtual machine.

18. The method of claim 17, further comprising facilitating reconfiguring network bandwidth to remove the virtual machine distribution connection.

19. The method of claim 16, wherein facilitating activating the virtual machine includes facilitating booting and configuring the virtual machine.

20. The method of claim 16, wherein the virtual machine is obtained from a network-connected storage device.

* * * * *